US008948054B2

(12) United States Patent
Kreeger et al.

(10) Patent No.: US 8,948,054 B2
(45) Date of Patent: Feb. 3, 2015

(54) SYSTEM AND METHOD FOR DISCOVERING MULTIPOINT ENDPOINTS IN A NETWORK ENVIRONMENT

(75) Inventors: Lawrence Kreeger, Fremont, CA (US); Suraj Nellikar, San Jose, CA (US); Sudarshana Kandachar Sridhara Rao, Bangalore (IN); Udayakumar Srinivasan, Fremont, CA (US); Anuraag Mittal, San Jose, CA (US); Lilian Sylvia Fernandes, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 74 days.

(21) Appl. No.: 13/341,726

(22) Filed: Dec. 30, 2011

(65) Prior Publication Data

US 2013/0170490 A1    Jul. 4, 2013

(51) Int. Cl.
H04L 12/28    (2006.01)
(52) U.S. Cl.
USPC .......................................................... 370/255
(58) Field of Classification Search
USPC ............ 370/254, 351, 389, 390, 392, 395.53; 709/232
See application file for complete search history.

(56) References Cited

U.S. PATENT DOCUMENTS

| 2005/0213560 | A1* | 9/2005 | Duvvury ....................... 370/351 |
| 2007/0008949 | A1* | 1/2007 | Balandin ....................... 370/351 |
| 2008/0089244 | A1* | 4/2008 | Yu ................................. 370/255 |
| 2008/0123551 | A1* | 5/2008 | Hanes ........................... 370/254 |
| 2008/0205394 | A1* | 8/2008 | Deshpande et al. ........... 370/390 |
| 2009/0022115 | A1* | 1/2009 | Berzin et al. .................. 370/338 |
| 2009/0037607 | A1* | 2/2009 | Farinacci et al. ............. 709/249 |
| 2010/0290473 | A1* | 11/2010 | Enduri et al. ............. 370/395.53 |
| 2010/0299452 | A1* | 11/2010 | Flammer et al. .............. 709/241 |
| 2011/0296252 | A1 | 12/2011 | Maenpaa |
| 2012/0003921 | A1* | 1/2012 | Scopigno et al. ............ 455/3.01 |
| 2012/0066369 | A1* | 3/2012 | Lelkens et al. ................ 709/223 |
| 2013/0124750 | A1* | 5/2013 | Anumala et al. ............. 709/232 |
| 2013/0138836 | A1* | 5/2013 | Cohen et al. .................. 709/250 |

FOREIGN PATENT DOCUMENTS

| WO | WO 2009/149756 A1 | 12/2009 |
| WO | WO 2013/101453 | 7/2013 |

OTHER PUBLICATIONS

Mahalingam, M., et al, "VXLAN: A Framework for Overlaying Virtualized Layer 2 Networks over Layer 3 Networks; draft-mahalingam-dutt-dcops-vxlan-OO.txt", VXLAN: A Framework for Overlaying Virtualized Layer 2 Networks Over Layer 3 Networks; Draft-Mahalingam-Duti-Dcops-Vxlan-OO.Txt, Internet Engineering Task Force, IETF; Aug. 27, 2011 pp. 1-21.*

(Continued)

*Primary Examiner* — Anh-Vu Ly
(74) *Attorney, Agent, or Firm* — Patent Capital Group

(57) ABSTRACT

An example method is provided and may include multicasting a discovery packet in an overlay network, which includes a Layer 2 scheme over a Layer 3 network; and identifying endpoints based on their respective responses to the discovery packet, where the endpoints are coupled across a multicast backbone. In more specific embodiments, the method may include identifying disconnected endpoints in the overlay network based on a lack of responses from the disconnected endpoints.

20 Claims, 4 Drawing Sheets

(56) References Cited

OTHER PUBLICATIONS

"Link Layer Discovery Protocol (LLDP): A New Standard for Discovering and Managing Converged Network Devices," Extreme Network Technical Brief; © 2006 Extreme Networks, Inc. All Rights Reserved; 5 pages.

PCT Feb. 25, 2013 Notification of Transmittal of the International Search Report and the Written Opinion of the International Searching Authority, or Declaration from International Application PCT/US2012/068996.

"OAM functions and mechanisms for Ethernet based networks; Y.1731 (02/08)," ITU-T Standard, International Telecommunication Union, Geneva; CH, No. Y.1731 (02/08); Feb. 29, 2008, pp. 1-80, XP017436643.

Kim, Namgon, et al, "A hybrid multicast connectivity solution for multi-party collaborative environments," Multimedia Tools and Applications, Kluwer Academic Publishers, BO, vol. 44, No. 1, Mar. 25, 2009, pp. 17-37, XP019684933.

Mahalingam, M., et al, "VXLAN: A Framework for Overlaying Virtualized Layer 2 Networks over Layer 3 Networks; draft-mahalingam-dutt-dcops-vxlan-OO.txt", VXLAN: A Framework for Overlaying Virtualized Layer 2 Networks over Layer 3 Networks; draft-mahalingam-dutt-dcops-vxlan-OO.txt, Internet Engineering Task Force, IETF; Standardworkingdraft, Internet Society (ISOC)4, Rue Des Falaises CH- 1205, Geneva, Aug. 27, 2011, pp. 1-21, XP015077813.

Feamster N., et al., "Measuring the Effects of Internet Path Faults on Reactive Routing," ACM, 2 Penn Plaza, Suite 701—New York USA, Jun. 14, 2003, XP040150887.

PCT Jul. 2, 2014 International Preliminary Report on Patentability from PCT/US2012/068996.

* cited by examiner

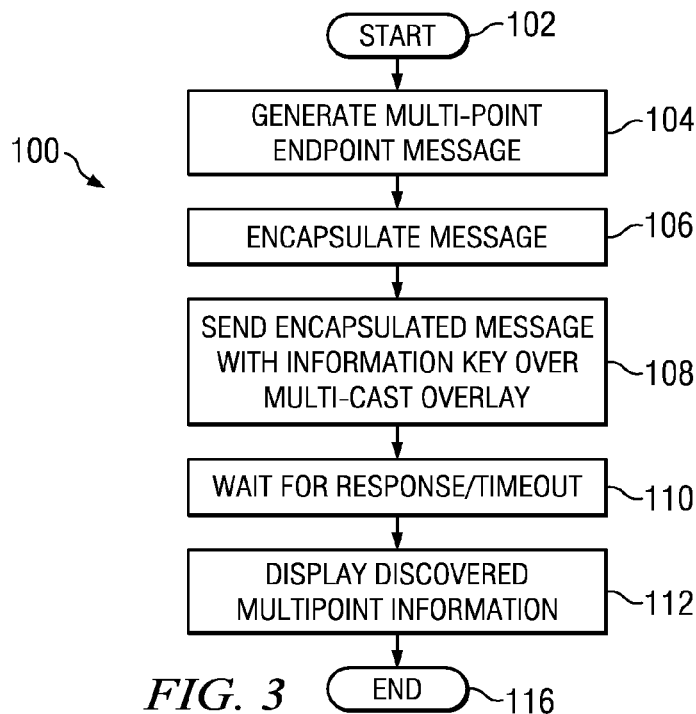

FIG. 3

```
cinquedia(config)# show cdp neighbors

Device-ID          Hldtme    Platform    Port ID

VEM-1 vmknic ip    123       N1k         Eth3/5
VEM-2 vmknic ip    123       N1k         Eth4/5
VEM-3 vmknic ip    123       N1k         Eth3/5
VEM-4 vmknic ip    123       N1k         Eth4/5 cinquedia(config)# show cdp neighbors vxlan 5000

Device-ID          Hldtme    Platform    Port ID

VEM-1 vmknic ip    123       N1k         Eth3/5
VEM-3 vmknic ip    123       N1k         Eth4/5 cinquedia(config)# show cdp neighbors verify 172.23.231.100 172.23.231.200

Device-ID (from)    Device-ID (to)       Reachable 172.23.231.100      172.23.231.200       Success
172.23.231.200      172.23.231.100       Failure
```

SYSTEM AND METHOD FOR DISCOVERING MULTIPOINT ENDPOINTS IN A NETWORK ENVIRONMENT

TECHNICAL FIELD

This disclosure relates in general to the field of communications and, more particularly, to a system and a method for discovering multipoint endpoints in a network environment.

BACKGROUND

Virtualization trends in the information technology (IT) arena are driving development of many virtualization technologies. One such technology relates to server virtualization. Server virtualization has gained prominence in many network environments such as within data centers. Server virtualization can mask server resources from the actual server users (e.g., masking the number and the identity of individual physical servers, processors, and operating systems (OS)). The server administrator uses a software application to divide one physical server into one or more isolated virtual environments (often referred to as virtual machines). Server virtualization can effectively be used to eliminate server sprawl, to assist in disaster recovery, for testing and development, to make more efficient use of server resources, to improve server availability, and to centralize server administration.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified flowchart illustrating example operations that may be associated with an embodiment of the system;

FIG. 4 is a simplified example display screen that may be associated with an embodiment of the system.

DETAILED DESCRIPTION OF EXAMPLE EMBODIMENTS

Overview

An example method is provided and may include multicasting a discovery packet in an overlay network, which includes a Layer 2 scheme over a Layer 3 network; and identifying endpoints based on their respective responses to the discovery packet, where the endpoints are coupled across a multicast backbone. In more specific embodiments, the method may include identifying disconnected endpoints in the overlay network based on a lack of responses from the disconnected endpoints.

The endpoints can be Virtual Ethernet Modules (VEMs) configured to support one or more virtual machines (VMs). The discovery packet can be provided in a type-length-value (TLV) format and includes an identifier that identifies a segment of the overlay network. The discovery packet can be a Cisco Discovery Protocol (CDP) packet, a Link Layer Discovery Protocol (LLDP) packet, etc.

The overlay network can be a Virtual eXtensible Local Area Network (VXLAN); a Network Virtualization Generic Routing Encapsulation (NV-GRE) network; or a media access control (MAC)-in-MAC network. The overlay network can be a multi-tenant VXLAN comprising one or more segments that are identified by a corresponding VXLAN segment identifier (VNI). In more specific embodiments, the method may include aggregating the responses into multipoint information; and displaying the multipoint information.

Example Embodiments

Figure 1:
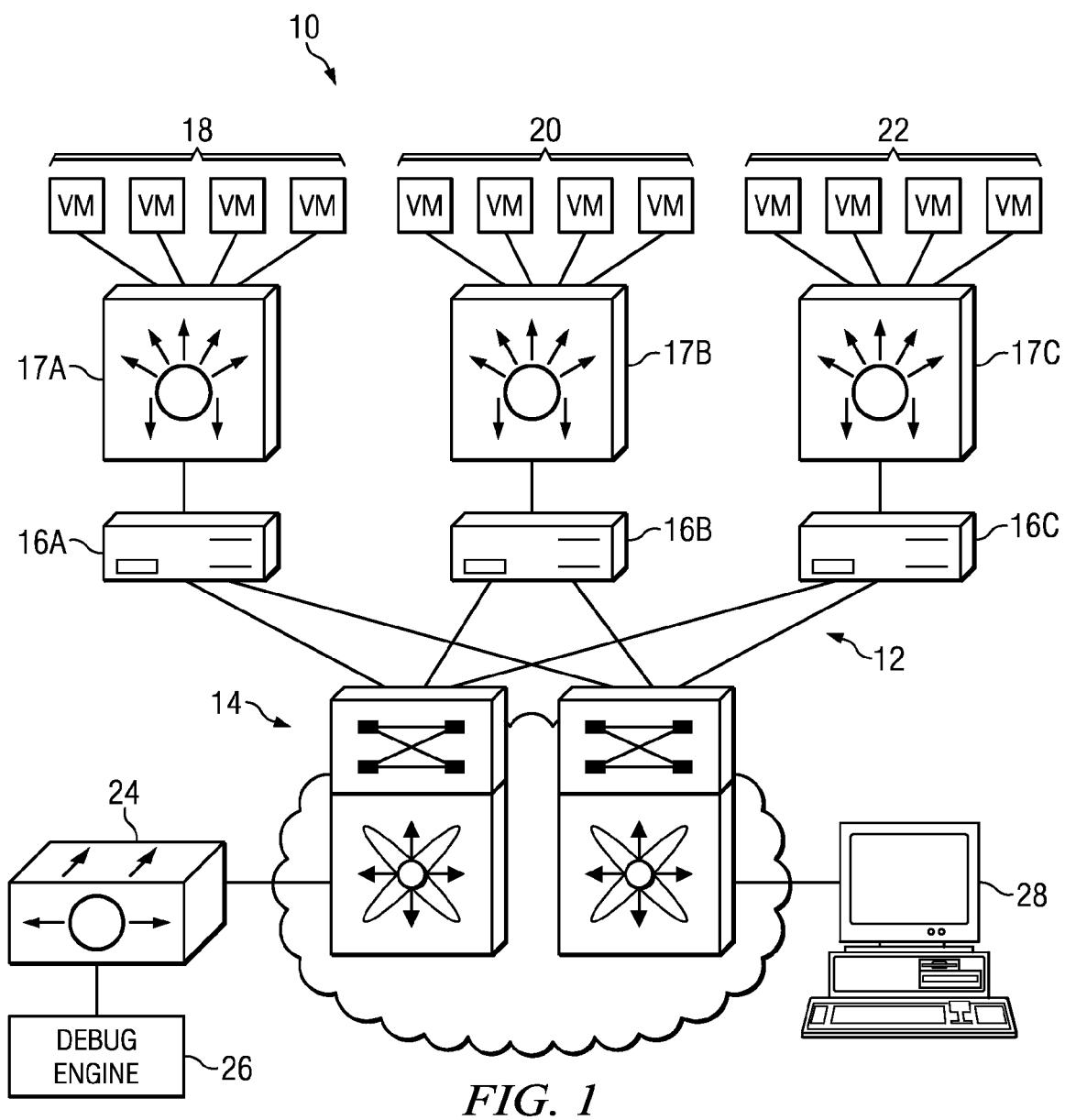
FIG. 1 is a simplified block diagram illustrating a system for discovering multipoint endpoints in a network environment in accordance with one embodiment.

Turning to FIG. 1, FIG. 1 is a simplified block diagram illustrating a system 10 for discovering multipoint endpoints in a network environment. In certain implementations, the architecture of FIG. 1 is configured to provide a framework for discovering endpoints in a multicast overlay environment for subsequent troubleshooting of network issues. FIG. 1 includes an overlay network 12 that connects one or more switches 14 to a plurality of servers 16a, 16b, and 16c. The terminology "overlay network" simply refers to a computer or a communications network that is provisioned on top of another network, such as a Layer 2 overlay scheme provisioned over a Layer 3 network. Examples of such overlay networks can include (but are not limited to) Virtual eXtensible Local Area Networks (VXLANs), Network Virtualization Generic Routing Encapsulation (NV-GRE), media access control (MAC)-in-MAC, etc. Overlay network 12 may support one or more multicast networks, which provide an encapsulation scheme to address Layer 2 and Layer 3 data center network infrastructure in the presence of virtual machines (VMs) (e.g., in a multi-tenant environment). In particular implementations, servers 16a, 16b, and 16c may be provisioned with Virtual Ethernet Modules (VEMs) 17a, 17b, and 17c respectively. VEMs 17a, 17b, and 17c provide advanced networking capability to one or more VMs 18, 20, and 22, respectively.

Switches 14 may be provisioned with a Virtual Supervisor Module (VSM) 24, which controls the one or more VEMs (e.g., VEM 17a-c) as one modular switch. VSM 24 is configured to support multiple VEMs 17a-c provisioned in software inside physical servers 16a-c, respectively. The configuration of VEMs 17a-c may be provided through VSM 24 and automatically propagated to the VEMs. VEMs 17a, 17b, and 17c utilize configuration information from VSM 24, perform Layer 2 switching, and offer advanced networking functions, such as port channels, quality of service (QoS), security (e.g., private virtual local area network (VLAN), port security, etc.), and monitoring (e.g., netflow, switch port analyzer (SPAN), encapsulated remote SPAN, etc.). Network administrators can define configurations on all VEMs 17a-c from a single interface coupled to VMS 24. VSM 24 may be provisioned with a debug engine 26 that is configured to check for link connectivity on overlay network 12. In the embodiment illustrated in FIG. 1, VSM 24 may be integrated with a server 28, which provides a single console to operate and to manage VSM 24.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of system 10. For ease of description, only two representative server farms are illustrated. Alternatively, any number of server farms and switches may be connected in overlay network 12.

For purposes of illustrating the techniques and capabilities of system 10, it is important to understand the communications in a given system. The following foundational information may be viewed as a basis from which the present disclosure may be properly explained. Such information is offered earnestly for purposes of explanation only and, accordingly, should not be construed in any way to limit the broad scope of the present disclosure and its potential applications. In a multicast network, several nodes (also called hosts or endpoints) may be interconnected over an Internet Protocol (IP) infrastructure in a virtual or physical network to enable one-to-many and many-to-many network delivery services. A "node" may be any electronic device (e.g., machine device or a mobile device), client, server, peer, service, application, VEM, VM, or other object capable of sending, receiving, or forwarding information over communications channels in a network. An "endpoint" as used herein, encompasses any nodes that originate data packets in a network flow, and/or any nodes that are a destination of the data packets in the network flow. Hence, the endpoints can be associated with clients, customers, handheld devices, or end users wishing to initiate a communication in system 10 via some network. The term "endpoint" is inclusive of devices used to initiate a communication, such as a receiver, a computer, a router, a gateway, a network appliance, a proprietary device, a set-top box, an Internet radio device (IRD), a cell phone, a smartphone of any kind, a tablet, a personal digital assistant (PDA), an iPhone, an iPad, a Google Droid, or any other device, component, element, or object capable of initiating voice, audio, video, media, or data exchanges within system 10. The endpoints may also be inclusive of a suitable interface to the human user, such as a display, a keyboard, a touchpad, a remote control, or other terminal equipment. The endpoints may also be any device that seeks to initiate a communication on behalf of another entity or element, such as a program, a database, or any other component, device, element, or object capable of initiating an exchange within system 10. Data, as used herein in this document, refers to any type of numeric, voice, video, media, or script data, or any type of source or object code, or any other suitable information in any appropriate format that may be communicated from one point to another.

Endpoints may also include VEMs connected to each other across a multicast backbone (e.g., a virtual network backbone comprising a network of hosts, routers, switches (aggregation switches, access switches, core switches, etc.) and other network devices connected by physical or virtual communication links). In this sense, the multicast backbone encompasses any such backbone possibilities, which can serve as a link to endpoints and various other network elements in the network. The endpoint and network elements in the multicast backbone are typically enabled with multicast protocols for the efficient delivery of data to multiple receivers simultaneously.

Multicasting can provide one-to-many and many-to-many network delivery services for applications such as videoconferencing and for the audio that should be delivered to several other hosts simultaneously. As used herein, "multicasting" refers to delivering a message (e.g., a data packet) from a sender to a group of receivers (e.g., simultaneously in a single transmission). As used herein, the term "sender" encompasses nodes that send data packets to a receiver, and the term "receiver" encompasses nodes that receive data packets from a sender. Multicasting scales to a large receiver population by not requiring prior knowledge of how many receivers are present. Multicasting uses network infrastructure efficiently by sending a data packet from a sender only once, even if the data packet is to be delivered to a large number of receivers.

In a multicast network, the sender usually does not know who receives the data packet. The sender merely sends the data packet to a multicast address (e.g., 224.0.0.0, 239.255.255.255, 01:00:0c:cc:cc:cc, 01:80:c2:00:00:0e, 01:80:c2:00:00:03, 01:80:c2:00:00:00 etc.). The multicast address is typically associated with a group of interested receivers. Intermediary routers in the multicast backbone make copies of the data packet and send them to the appropriate receivers that have joined the multicast group. When a host wishes to join a multicast group with a specific multicast address, the host issues an Internet Group Management Protocol (IGMP) request. A multicast router for that subnet can then inform other routers so that the multicast data packets to the group may eventually be placed on the local area network (LAN) of the host.

Separately, server virtualization invalidates several assumptions of traditional (or physical) server access network designs. For example, one such assumption is that each network access port corresponds to a single physical server running a single image, and that the relationship between an image and the network is static. Server virtualization effectively enables OS images to become mobile. The consequences of this level of mobility on the network are not trivial, and their effects may extend beyond just the access layer.

With virtualization enabling multiple OSs to share a single physical server, it may be desired, or even necessary, to replicate traditional security and segmentation for virtualized servers because virtualization may create obscured and uncertain security boundaries. Virtualized networks may have to support many features such as multiple lines of business or tenants: each of which requires a protected and trusted virtual computing environment. Other features can include workload elasticity, in which virtual servers are instantiated to address increased workloads and periodically stopped or removed to support data center efficiency and green computing. Still other features can address the elevated requirements for high availability and scalability.

In virtualized environments, the endpoints (e.g., hosts) in the multicast network can be generally distributed over the network. Technologies exist where the endpoints in the same L2 domain can span across data centers using an overlay network. Some technologies like Generic Routing Encapsulation (GRE) and more recently VXLANs, use multicast as the overlay to stretch Layer 2 (L2) domains. Using multicast as an overlay, there can be potentially numerous tunnels created, where the endpoints can be agnostic. Identifying the actual endpoints in such an environment can be a challenge. In addition, troubleshooting issues in the network (due to multicast problems) can be problematic.

Multicast pings and mtrace protocols exist today to discover endpoints in the multicast network. For example, an end host can ping the multicast group, and members of that multicast group may reply back to the ping. However, this approach may not provide application-level visibility because the same multicast group can be used for different applications like GRE, VXLANs, or generic multicast traffic, as the multicast space is limited. In addition, such an approach may not work if the end hosts that belong only to a particular GRE key/VXLAN Network Identifier (VNI) etc. are to be identified.

In regards to overlay networks, a VXLAN implementation is addressed herein in this Specification to discuss some of the capabilities of system 10. [It is imperative to note that while embodiments of the present disclosure may be applied to any kind of overlay networks (e.g., NV-GRE, MAC-in-MAC, etc.) such discussions should not be construed in any way to limit the broad scope of the present disclosure and its potential applications.] VXLAN is a tunneling scheme that may be used to overlay Layer 2 networks over Layer 3 networks. Each overlay is a VXLAN segment. VMs within the same VXLAN segment can communicate with each other. Each VXLAN segment may be identified by its VNI, which may be a 24-bit segment ID. Endpoints (called Virtual Tunneling Endpoints or VTEP) of VXLAN tunnels may comprise VEMs on servers that include the VMs. Thus, the VNI and VXLAN related tunnel are known only to the VTEP (and not to other entities such as the VMs).

VTEPs are generally intended to be at the edge of the network, typically connecting an access switch (virtual or physical) to an IP transport network. It is expected that the VTEP functionality would be built into the access switch, but it is logically separate from the access switch. The VTEP may behave as an IP host for the IP network to which it is connected. The IP network may include a multicast backbone. Each VTEP may be configured with an IP address based on the subnet to which its IP interface is connected. The VTEP can use this IP interface to exchange data packets carrying encapsulated Ethernet frames with other VTEPs. A VTEP may also act as an IP host by using IGMP to join IP multicast groups.

VXLAN is typically deployed in data centers on virtualized hosts (e.g., VMs) over one or more servers. The servers may be part of the same (e.g., Layer 2) network, or a different (e.g., Layer 3) network. The VXLAN segments are overlaid on top of the Layer 2 or Layer 3 networks. The VMs do not know about the overlay networks and transport method since the encapsulation and decapsulation happen transparently at the VTEPs on the respective servers. VXLANs may be deployed on networks where all hosts understand the VXLAN protocol. Alternatively, VXLANs may be deployed on networks where only some of the hosts understand the VXLAN protocol. For example, nodes on a VXLAN overlay network may need to communicate with nodes on legacy networks, which could be VLAN based. To enable the communication, a network can include VXLAN gateways, which forward traffic between VXLAN and non-VXLAN environments. A provisioned gateway strips out the VXLAN header from incoming frames and forwards them to a physical port based on the destination MAC address of the inner Ethernet frame. In the reverse direction, incoming frames for the non-VXLAN interfaces are mapped to a specific VXLAN overlay network based on the VLAN ID in the frame.

With VXLAN, when a VM sends a frame, it is encapsulated in a User Datagram Protocol (UDP) data packet along with the VNI, which uniquely identifies the VXLAN segment. Traditional IEEE 802.1Q switching occurs within the segment. Instead of broadcasting a frame as in the case of unknown unicast, the UDP data packet is multicast to the set of VEMs that have VMs on the same VXLAN segment. When a new VM is brought up on an existing VXLAN, an IGMP join for the VXLAN multicast group is sent from the respective VEM of the VM. The multicast group address is used to encapsulate broadcast, multicast, and unknown unicast traffic from VXLAN VMs. A header including the VXLAN VNI is inserted at the beginning of the multicast data packet. The multicast data packet is sent out (i.e., multicasted) to a multicast group on which that VXLAN segment is realized. The receiver-endpoint sends a standard address resolution protocol (ARP) response using IP unicast. After the VEM has learned the IP address for which the virtual machine is located, the data packet can be sent directly to the destination VEM without multicast support.

In a cloud environment, the VXLAN can span across multiple endpoints and each VEM can belong to multiple VXLANs. VXLANs can be reliant on the multicast backbone of the physical infrastructure. As VXLANS can span within and across clusters, any failures in this environment may affect the VXLAN's network infrastructure, thereby making debugging/troubleshooting difficult. For example, turning to overlay network 12 of FIG. 1, assume VMs 18, 20 and 22 are on the same VXLAN with a VNI of 5000 and belong to a multicast group with an address 225.1.1.1. There can be situations where VM 18 and VM 20 are communicating well with each other, but VM 18 and VM 22 are not able to exchange communications. The network administrator has no clue as to whether the issue is in the respective VMs, switches 14, or upstream devices (like physical network switches and routers of the physical infrastructure). In another case, the unicast traffic may be fine between VEMs 17*a-c*, but the multicast traffic may be broken. Such scenarios are painstakingly difficult to debug, where such debugging activities are tedious in nature. Additionally, in multicast pings, only the transmit path is a multicast data packet, whereas the return paths are unicast from the endpoints. Thus, two-way multicast path verification cannot be guaranteed.

System 10 is configured to address these issues (and others) in offering a system and method for discovering multipoint endpoints in a network environment. According to various embodiments, debug engine 26 can enable discovery packets for each VXLAN on a virtual interface ((e.g., a Virtual Machine Kernel Network Interface Card (VMKNIC)) capable of VXLAN in overlay network 12. As used herein, the term "discovery packets" encompass any suitable link layer (e.g., data link layer in Layer 2) network protocol data packets. The discovery packets can optionally be provided in a type-length-value (TLV) frame format, which may be used to share information (e.g., identity, IP address, capabilities, etc.) about nodes in a network. Hence, discovery packets may be associated with protocols such as Cisco Discovery Protocol (CDP), Link Layer Discovery Protocol (LLDP), Extreme Discovery Protocol (EDP), Foundry Discovery Protocol (FDP), Nortel Discovery Protocol (NDP), SynOptics Network Management Protocol (SONMP), etc. Any link layer discovery protocol may be used in system 10 without departing from the broad scope of the present disclosure. For ease of illustration, and not as a limitation, the CDP protocol will be described herein to explain certain capabilities and features of the present disclosure.

CDP is a Data Link Layer network protocol that is typically used to share information (e.g., operating system version and IP address) associated with other directly connected nodes. Network devices that support CDP send CDP announcements to a multicast destination address 01:00:0c:cc:cc:cc. These multicast data packets may be received by other directly connected nodes (that support CDP) at their connected network interface. Each node that supports CDP stores the information received from other nodes in a table that can be viewed using an appropriate command such as a show CDP neighbors command. The information contained in the CDP announcements may include the operating system version, hostname, IP address from all protocol(s) configured on the port where CDP frame is sent, port identifier from which the announcement was sent, device type and model, duplex setting, VTP domain, native VLAN, power draw (for Power over Ethernet devices), and other device specific information.

Typically, CDP packets can be used to obtain protocol addresses of neighboring devices in a general network (not necessarily implementing VXLAN technology, or equivalent overlay schemes). CDP cannot be used to provide information about devices that are not directly connected because CDP packets are Layer 2 data packets. Routers generally do not forward Layer 2 traffic by default; switches recognize the MAC multicast address used by CDP as a special address and will not forward packets from other interfaces. Therefore, only directly connected neighbors receive the CDP packets. However, embodiments of system 10 can be configured to use CDP packets (or discovery packets in other link layer formats) for obtaining information about endpoints that may not be connected directly over an overlay network such as VXLAN.

Particular of the present disclosure provide for discovering endpoints across a multicast backbone in a network environment that implements an overlay scheme using suitably configured discovery packets. Because VXLAN (and other similar overlay schemes) present a Layer 2 network in each VXLAN segment (irrespective of whether the endpoints are directly connected), discovery packets (such as CDP packets) may be exchanged between the nodes in the VXLAN segment to troubleshoot connectivity.

According to embodiments of the present disclosure, after receiving the discovery packet, each VEM 17a-c may validate the TLV parameters on the discovery packet. Each VEM 17a-c may identify the sender as a neighboring device, and respond appropriately. The application TLVs in the discovery packet can be used to exchange at least the VNI and IP address of remote VEMs (e.g., VMKNIC IP) for verifying point-to-point connectivity. A command line interface (CLI) can provide filters for debugging (e.g., per-VXLAN). The operations and infrastructure provided by system 10 can apply to encapsulation solutions such as VXLAN, NV-GRE, and MAC-in-MAC, along with virtual or physical devices that support such encapsulation solutions. Embodiments of system 10 can enable network administrators to clearly isolate upstream (e.g., multicast backbone) issues from the virtual switch or VM issues. Embodiments of system 10 can make it easy to troubleshoot in large data center deployment across multiple distributed virtual switches (DVSs) and provide a mechanism to discover the hosts of a VXLAN segment.

Embodiments of system 10 can also discover endpoints in a tunnel environment such as in any multicast overlay network. In a data center environment (such as that which is being provided by overlay network 12), a network administrator can be provided a CLI to trigger discovery from VSM 24. VSM 24 may direct VEMs 17a-c to send discovery packets. An endpoint (e.g., VEM 17a) can send discovery packets (which may be encapsulated using the multicast overlay) to all other endpoints (e.g., VEM 17b and 17c) in overlay network 12. The other endpoints (e.g., VEMs 17b and 17c) can thereby learn the presence of the source endpoint (e.g., VEM 17a). This information can be pushed to VSM 24, which can aggregate the information from all the endpoints and provide (e.g., display) the discovered endpoints to the network administrator.

If there is a connectivity problem in the VXLAN segment, the problem may be located at one or more of the following: (1) one or more VMs; (2) between VMs and VEMs; and (3) between VEMs. Using discovery packets may enable network administrators to determine efficiently (e.g., using one or two commands on a CLI) whether the connectivity issue is between the VEMs, and if so, which VEMs are impacted by the connectivity issue.

Moreover, an advantage of using discovery packets (with the TLV being enabled) could be that application-specific TLVs may be inserted into the discovery packets. For example, endpoints can be segregated per-application. The application TLV can carry a specific GRE key/VNI (or any other identifier), and only those endpoints may be discovered that carry this specific identification information. Further, various embodiments may use the multicast MAC address as the destination MAC address, thereby verifying a two-way multicast path. The discovered multipoint information can be viewed at VSM 24 using suitable display mechanisms.

Application specific TLVs can also be used to troubleshoot issues in overlay network 12, where an issue in the upstream connectivity (e.g., configuration) may be easily identified by this approach. For example, the server administrator may identify that two VMs (e.g., one of VM 18 and one of VM 20) are not talking to each other, and may inform the network administrator accordingly. The network administrator can identify the VEMs (e.g., VEM 17a and 17b) on which VMs 18 and 20 are hosted, and then verify the working condition of the upstream-multicast connectivity. The route between the two endpoints can be verified by putting in an endpoint identifier (e.g., VMKNIC IP address in the case of VXLANS) in the discovery packet so that only that specific endpoint replies (e.g., VEM 17b or 17a). The network administrator can thus easily deduce whether the issue is because of upstream connectivity or not.

Turning to the infrastructure of system 10, the network topology can include any number of servers, VMs, DVSs, virtual routers, VSMs, and other nodes inter-connected to form a large and complex virtual overlay network 12. More specifically, debug engine 26, servers 16a-c, VEMs 17a-c, switches 14, VSM 24, and/or server 28 may be configured (or cooperate with each other) to perform certain activities discussed herein. Furthermore, these devices are network elements that can facilitate many of the processing, communications, and/or discovery activities discussed herein. As used herein in this Specification, the term 'network element' is meant to encompass routers, servers, switches, cable boxes, gateways, bridges, loadbalancers, firewalls, inline service nodes, proxies, processors, modules, or any other suitable device, component, element, proprietary appliance, user equipment, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. System 10 may include a configuration capable of transmission control protocol/Internet protocol (TCP/IP) communications for the electronic transmission or reception of data packets in a network. System 10 may also operate in conjunction with a user datagram protocol/IP (UDP/IP) or any other suitable protocol, where appropriate and based on particular needs. In addition, gateways, routers, switches, and any other suitable nodes (physical or virtual) may be used to facilitate electronic communication between various nodes in the network.

The example network environment may be configured over a physical infrastructure that may include one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Figure 2:
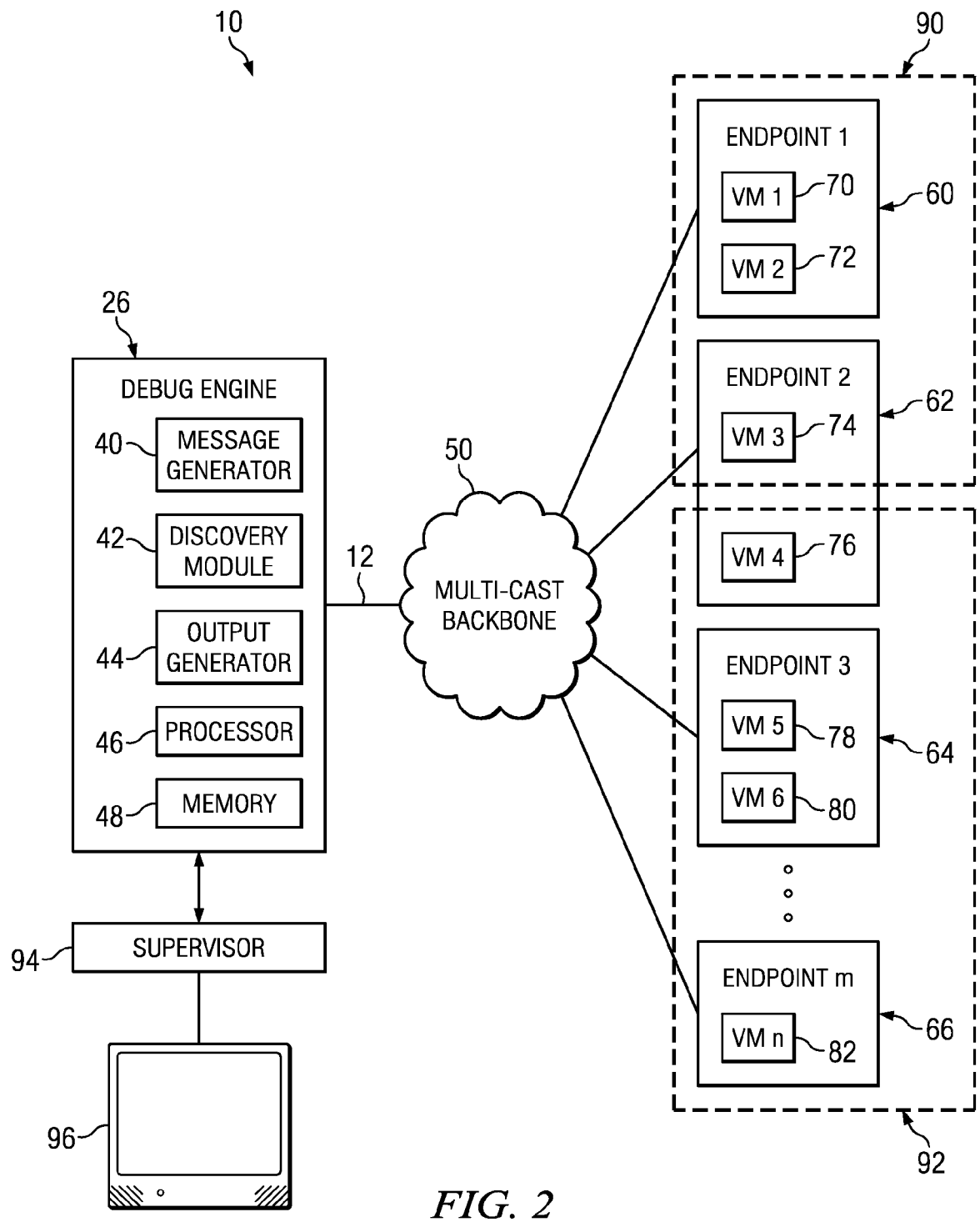
FIG. 2 is a simplified block diagram illustrating example details of the system in accordance with one embodiment.

Turning to FIG. 2, FIG. 2 is a simplified block diagram illustrating additional details of system 10 according to an embodiment of the present disclosure. Debug engine 26 may include a message generator 40, a discovery module 42, an output generator 44, a processor 46, and a memory 48. Debug engine 26 may be connected to a multicast backbone 50 over overlay network 12. Multicast backbone 50 interconnects 'm' VEMs (also referred to as endpoints) 60-66 that host 'n' VMs 70-82. Multicast backbone 50 may comprise switches, routers, links, and other network devices that facilitate communication between the various nodes in overlay network 12. Each VEM may include one or more VMs. For example, VEM 60 includes VMs 70 and 72. VEM 62 includes VMs 74 and 76. VEM 64 includes VMs 78 and 80. VEM 66 includes VM 82. One or more VMs may be part of a VXLAN segment that can be identified by a corresponding VNI. For example, VMs 70, 72, and 74 are part of VXLAN segment 90, and VMs 76, 88, 80, and 82 are part of VXLAN segment 92. Debug engine 26 may be connected to a supervisor 94, which may be controlled over a suitable user interface such as a CLI on display 96. In one embodiment, supervisor 94 may be part of VSM 24.

For purposes of discussion, an assumption is made that VM 70 in VEM 60 is not interacting with VM 74 in VEM 62. The reason for the lack of connectivity may include an issue with multicast backbone 50 (e.g., communication links between VEM 60 and VEM 74), or an issue with VM 70 or VM 74 individually, or an issue between VMs and VEMs, for example, between VM 60 and VEM 60, or between VM 74 and VEM 62. According to embodiments of the present disclosure, debug engine 26 may cause a discovery packet to be sent to appropriate endpoints, which in this example scenario includes VEM 60 and VEM 62 such that the connectivity issue may be resolved (or at least narrowed down).

According to various embodiments, debug engine 26 may multicast a discovery packet in overlay network 12. The discovery packet may be configured to discover endpoints connected across multicast backbone 50 and belonging to a segment of overlay network 12 (e.g., VXLAN segment with a corresponding VNI). Message generator 40 may generate a discovery packet including appropriate TLV information and an appropriate identifier such as a VNI corresponding to VXLAN segment 90, to which VMs 70 and 74 belong. In some embodiments, the discovery packet may be generated regularly at periodic time intervals (e.g., every five minutes). In other embodiments, the discovery packet may be generated by a user as needed or desired. Automatic polling may flood the network and introduce unnecessary processing for the VEMs (e.g., VEMs 60-66) and supervisor 94. In the user-triggered option, the user triggers the discovery packet for specific purposes such as debugging the network. Discovery module 42 may multicast the discovery packet to endpoints belonging to the appropriate VXLAN segment 90 in overlay network 12. In the example described herein such endpoints are VEM 60 and 62. In one embodiment, overlay network 12 is a Layer 2 overlay scheme over a Layer 3 network, the discovery packet is a Layer 2 data packet, and the method of distribution is multicasting. Hence, the endpoints may respond to the Layer 2 discovery packet irrespective of whether they are directly or indirectly connected to debug engine 26.

Discovery module 42 may wait for a response or a timeout from the various VEMs (e.g., VEM 60 and 62), and aggregate the received information (also referred to herein as discovered multipoint information). If the connectivity issue is at multicast backbone 50, VEM 60, or 62, (or both) may fail to respond to the discovery packet depending on which link has the connectivity issue. Thus, the response may timeout, and discovery module 42 may record such timeout. Output generator 44 may cause a display of the discovered multipoint information on display 96, as appropriate. In the case where the connectivity issue is at multicast backbone 50, for example, the link connecting VEM 64 with multicast backbone 50), the output may indicate that VEM 62 is not responding.

In another example scenario, a network administrator may want to discover all VEMs in a VXLAN segment, for example, VXLAN segment 92. The network administrator may cause debug engine 26 to multicast a discovery packet to endpoints (as yet unknown) in VXLAN segment 92. Message generator 40 generates a discovery packet including appropriate TLV information and an appropriate identifier (e.g., a VNI or a GRE key corresponding to VXLAN segment 92). Discovery module 42 may multicast the discovery packet to all endpoints belonging to VXLAN segment 92 in overlay network 12. VEMs 64-66 may respond to the discovery packet appropriately. Discovery module 42 may aggregate the discovered multipoint information. The discovered multipoint information may include VEM identification (such as IP address) of all VEMs that responded. Output generator 44 may cause a display of the discovered multipoint information on display 96. Thus, relevant endpoints may be identified based on responses to the discovery packet from the respective endpoints.

In various embodiments, debug engine 26 may be located on supervisor 94, which may be associated with a dedicated server (e.g., server 28) and virtual switch separate from VEMs 60-66. In other embodiments, debug engine 26 may be located on virtual switches associated with one or more servers in overlay network 12 (e.g., servers that house VEMs 60-66). For example, debug engine 26 may be located on the same server that houses VEM 60. In yet another example embodiment, debug engine 26 may be located on a virtual services appliance associated with VSM 24. Various other configurations of debug engine 26 are possible within the virtualized environment of overlay network 12. Note that in various embodiments, processor 46 and memory 48 may be part of a network element that may be physically separate from the other components of debug engine 26 (e.g., message generator 40, discovery module 42, etc.). In various embodiments, the components of debug engine 26 may be coupled together on one physical device, or they may be located on separate physical devices and interconnected logically into debug engine 26 in any suitable combination based on particular needs.

Turning to FIG. 3, FIG. 3 is a simplified flowchart 100 illustrating operations that may be associated with embodiments of the present disclosure. The operations may begin at 102, when debug engine 26 is activated. At 104, a multi-point endpoint message is generated by message generator 40. At 106, the message is encapsulated appropriately, for example, by inserting suitable TLV information such that a discovery packet is created. At 108, the encapsulated message with the information key (e.g., VNI, etc.) may be sent over the multicast overlay by discovery module 42. At 110, discovery module 42 may wait for a response (or alternatively, a timeout from the receivers). At 112, discovery module 42 may aggregate the received information and output generator 44 may cause a display of the discovered multipoint information on display 96. The process ends at 116, when the endpoints have been discovered.

Turning to FIG. 4, FIG. 4 is an example output screen 200 according to an embodiment of the present disclosure. Output screen 200 may display the multipoint information received by discovery module 42. The multipoint information may include a list of VEMs (e.g., identified by VEM name or suitable ID), VEM IP addresses, etc. The multipoint information that can be obtained (and displayed) can include any device, system, or network information that serves to identify VEMs in a particular network. The multipoint information may be displayed by output generator 44 based on suitable commands on a CLI, or automatically, or caused by event triggers (such as a VEM disconnection from a VXLAN segment).

For example, a suitable command such as 'cinquedia (config) # show cdp neighbors' may bring up a list of VEMs belonging to overlay network 12. Output screen 200 can indicate that four VEMs (e.g., VEM1, VEM2, VEM3, and VEM4) are connected in the VXLAN. Another suitable command such as 'cinquedia (config) # show cdp neighbors vxlan 5000' may bring up a list of VEMs belonging to the same VXLAN segment (e.g., identified by the corresponding VNI 5000). Output screen 200 indicates that VEM1 and VEM 3 belong to VXLAN segment 5000. Yet another suitable command such as 'cinquedia (config) # show cdp neighbors verify 172.23.231.100 172.23.231.200' may verify point-to-point multicast connectivity between two VEMs (e.g., at IP addresses 172.23.231.100 and 172.23.231.200). Output screen 200 can indicate that while the connection from the sender to the receiver does not have a problem, the return connection has failed. Note that the commands and the set of multipoint information listed herein are for example purposes only. The commands may be configured based on a particular host device, supervisor software or functionalities, software development kit (SDK), version, etc. The commands and the set of multipoint information listed herein are not intended to be limiting in any way to the broad scope of the present disclosure.

Figure 5:
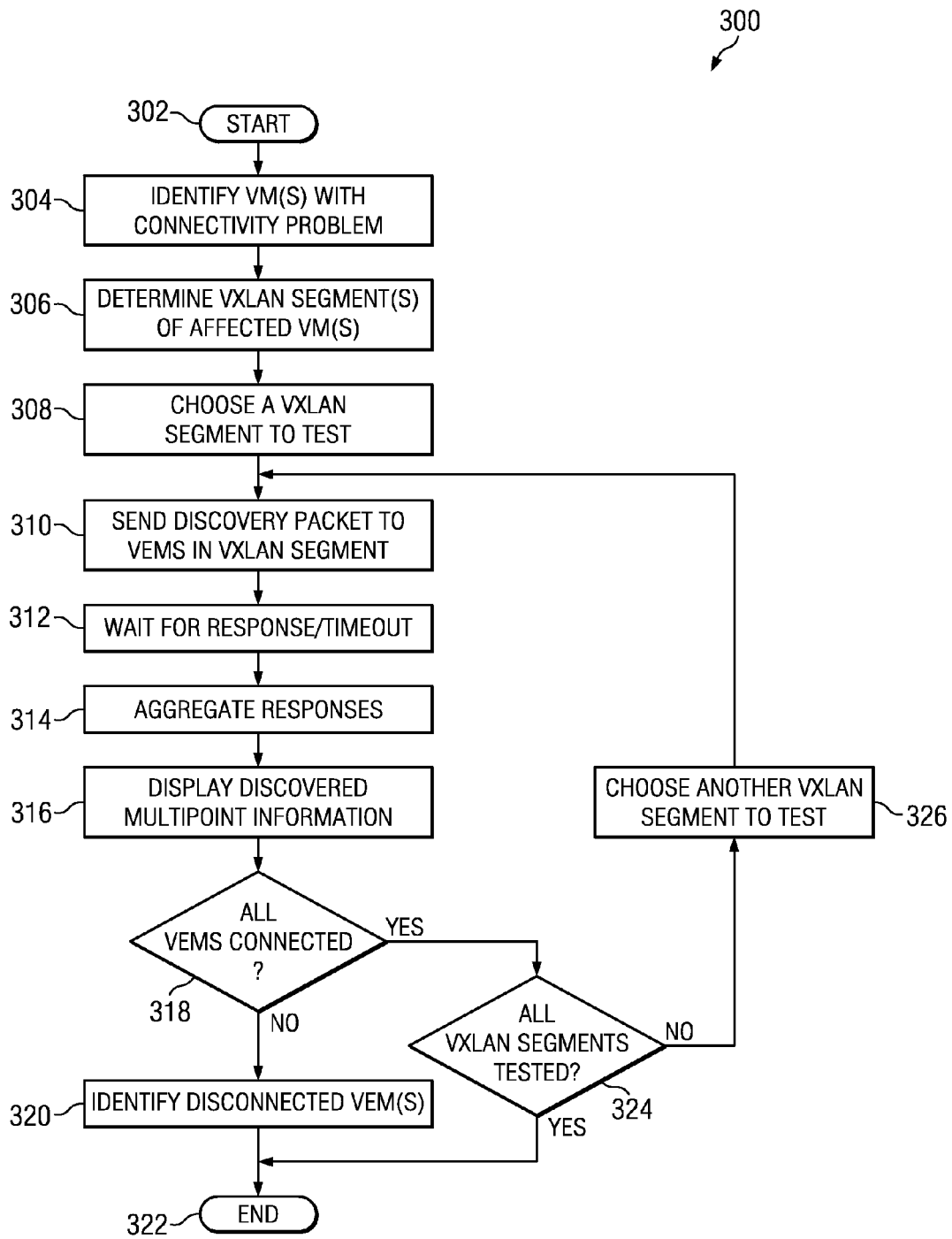
FIG. 5 is a simplified flowchart illustrating example operations that may be associated with an embodiment of the system.

Turning to FIG. 5, FIG. 5 is a simplified flowchart 300 illustrating example operational steps that may be associated with embodiments of the present disclosure. The operations may begin at step 302, when debug engine 26 is activated. At 304, VMs with a connectivity problem may be identified. In one embodiment, a network administrator may identify the VMs. In another embodiment, the VMs may be automatically identified by respective VEMs. At 306, the VXLAN segments of the affected VMs may be determined. In various embodiments, each VM may belong to multiple VXLAN segments. At 308, an affected VXLAN segment may be chosen to be tested. In one embodiment, the choice may be random. In another embodiment, the choice may be based on network policies, enterprise policies, or other suitable criteria that can be based on particular needs.

At 310, a discovery packet may be sent by debug engine 26 to VEMs in the chosen VXLAN segment. At 312, debug engine 26 may wait for a response or a timeout. At 314, debug engine 26 may aggregate responses from the VEMs. At 316, debug engine 26 may display the discovered multipoint information as appropriate. In one embodiment, the multipoint information may be displayed on a screen. In another embodiment, the multipoint information may be inserted into a report. In yet another embodiment, the multipoint information may be printed. At 318, a determination may be made whether all the VEMs in the VXLAN segment have responded, and whether they have been included in the multipoint information. If at least some of the VEMs have connectivity problems such VEMs would not be included in the multipoint information. At 320, such disconnected VEMs may be identified and the process can end at 322, where subsequent focused troubleshooting may be performed.

Alternatively, if all VEMs in the VXLAN segment are included in the multipoint information, as determined at 318, a subsequent determination is made at 324 whether all relevant VXLAN segments have been tested. If all VXLAN segments have been tested, it may indicate that there are no connectivity problems in the multicast backbone, and the connectivity problems may be associated with the individual VMs, or between the affected VMs and respective VEMs. The process may be ended at 322. Note that if all relevant VXLAN segments have not been tested, the operations may proceed to step 326, where a next VXLAN segment may be chosen for testing. Subsequently, steps 310 to 320 may be repeated for each relevant VXLAN segment identified at 306.

In example implementations, at least some portions of the activities outlined herein may be implemented in software provisioned in, for example, debug engine 26, servers 16a-c, VEMs 17a-c, switches 14, VSM 24, and/or server 28. In some embodiments, one or more of the discussed features may be implemented in hardware, provided external to these elements, or consolidated in any appropriate manner to achieve the intended functionality. Additionally, debug engine 26, servers 16a-c, VEMs 17a-c, switches 14, VSM 24, and/or server 28 may include software (or reciprocating software) that can coordinate in order to achieve the operations as outlined herein. In still other embodiments, these elements may include any suitable algorithms, hardware, software, components, modules, interfaces, or objects that facilitate the operations thereof. STOP Furthermore, debug engine 26, servers 16a-c, VEMs 17a-c, switches 14, VSM 24, and/or server 28 described and shown herein (and/or their associated structures) may also include suitable interfaces for receiving, transmitting, and/or otherwise communicating data or information in a network environment. Additionally, some of the processors and memories associated with the various nodes may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memories (e.g., memory 48) can store data used for the operations described herein. This includes the memory being able to store instructions (e.g., software, logic, code, etc.) that are executed to carry out the activities described in this Specification. A processor can execute any type of instructions associated with the data to achieve the operations detailed herein in this Specification. In one example, processor 46 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Any of the components in system 10 can include one or more memories (e.g., memory 48) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, system 10 may be applicable to other exchanges or routing protocols. Moreover, although system 10 has been illustrated with reference to particular elements and operations that facilitate the communication process, these elements, and operations may be replaced by any suitable architecture or process that achieves the intended functionality of system 10.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    multicasting a discovery packet in an overlay network to endpoints coupled across a multicast backbone, wherein each endpoint comprises a virtual Ethernet Module (VEM) and can be associated with more than one segment of the overlay network, which includes a Layer 2 scheme over a Layer 3 network, each segment being identified by a unique segment identifier (ID), wherein the discovery packet comprises a link layer multicast discovery packet configured to discover endpoints in specific segments; and
    identifying the endpoints based on their respective responses to the discovery packet.

2. The method of claim 1, further comprising:
    identifying disconnected endpoints in the overlay network based on a lack of responses from the disconnected endpoints.

3. The method of claim 1, wherein the endpoints are configured to support one or more virtual machines (VMs).

4. The method of claim 1, wherein the discovery packet is provided in a type-length-value (TLV) format and includes identifiers of the specific segments of the overlay network.

5. The method of claim 1, wherein the overlay network is a selected one of a group of networks, the group consisting of:
    a) a Virtual eXtensible Local Area Network (VXLAN);
    b) a Network Virtualization Generic Routing Encapsulation (NV-GRE) network; and
    c) a media access control (MAC)-in-MAC network.

6. The method of claim 1, wherein the overlay network is a multi-tenant VXLAN comprising one or more segments that are identified by a corresponding VXLAN segment identifier (VNI).

7. The method of claim 1, further comprising:
    aggregating the responses into multipoint information; and
    displaying the multipoint information.

8. The method of claim 1, wherein the discovery packet is a selected one of a Cisco Discovery Protocol (CDP) packet and a Link Layer Discovery Protocol (LLDP) packet.

9. Non-transitory machine-readable media encoding logic that includes instructions for execution, which when executed by a processor is operable to perform operations, comprising:

multicasting a discovery packet in an overlay network to endpoints coupled across a multicast backbone, wherein each endpoint comprises a virtual Ethernet Module (VEM) and can be associated with more than one segment of the overlay network, which includes a Layer 2 scheme over a Layer 3 network, each segment being identified by a unique segment identifier (ID), wherein the discovery packet comprises a link layer multicast discovery packet comprises a link layer packet configured to discover endpoints in specific segments; and identifying the endpoints based on their respective responses to the discovery packet.

10. The media of claim 9, the operations further comprising:

identifying disconnected endpoints in the overlay network based on a lack of responses from the disconnected endpoints.

11. The media of claim 9, wherein the endpoints are configured to support one or more virtual machines (VMs).

12. The media of claim 9, wherein the discovery packet is provided in a type-length-value (TLV) format and includes identifiers of the specific segments of the overlay network.

13. The media of claim 9, wherein the overlay network is a selected one of a group of networks, the group consisting of:

d) a Virtual eXtensible Local Area Network (VXLAN);

e) a Network Virtualization Generic Routing Encapsulation (NV-GRE) network; and f) a media access control (MAC)-in-MAC network.

14. The media of claim 9, wherein the overlay network is a multi-tenant VXLAN comprising one or more segments that are identified by a corresponding VXLAN segment identifier (VNI).

15. The media of claim 9, the operations further comprising:

aggregating the responses into multipoint information; and displaying the multipoint information.

16. The media of claim 9, wherein the discovery packet is a selected one of a Cisco Discovery Protocol (CDP) packet and a Link Layer Discovery Protocol (LLDP) packet.

17. An apparatus, comprising:

a debug engine;

a memory for storing instructions; and a processor operable to execute the instructions such that the apparatus is configured for:

multicasting a discovery packet in an overlay network to endpoints coupled across a multicast backbone, wherein each endpoint comprises a virtual Ethernet Module (VEM) and can be associated with more than one segment of the overlay network, which includes a Layer 2 scheme over a Layer 3 network, each segment being identified by a unique segment identifier (ID), wherein the discovery packet comprises a link layer multicast discovery packet comprises a link layer packet configured to discover endpoints in specific segments; and identifying the endpoints based on their respective responses to the discovery packet.

18. The apparatus of claim 17, wherein the apparatus is further configured for:

identifying disconnected endpoints in the overlay network based on a lack of responses from the disconnected endpoints.

19. The apparatus of claim 17, wherein the apparatus is further configured for:

aggregating the responses into multipoint information; and displaying the multipoint information.

20. The apparatus of claim 17, wherein the discovery packet is provided in a type-length-value (TLV) format and includes identifiers of the specific segments of the overlay network.

* * * * *